(12) United States Patent
Moret et al.

(10) Patent No.: US 10,304,140 B1
(45) Date of Patent: May 28, 2019

(54) SYSTEM AND METHOD FOR FACILITATING GENERATION OF A POLICY BINDER

(71) Applicant: STATE FARM MUTUAL AUTOMOBILE INSURANCE COMPANY, Bloomington, IL (US)

(72) Inventors: Daniel Dean Moret, Bloomington, IL (US); Dawn Lynette Meiss, Fairbury, IL (US); Paul William Vogel, Bloomington, IL (US); Craig Allen Becker, Heyworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 769 days.

(21) Appl. No.: 14/921,315

(22) Filed: Oct. 23, 2015

(51) Int. Cl.
*G06Q 40/00* (2012.01)
*G06Q 40/08* (2012.01)

(52) U.S. Cl.
CPC .................... *G06Q 40/08* (2013.01)

(58) Field of Classification Search
CPC ........ G06Q 10/00; G06Q 20/00; G06Q 30/00; G06Q 40/00
USPC ...................................................... 705/3-44
See application file for complete search history.

(56) References Cited

U.S. PATENT DOCUMENTS

| 6,714,914 | B1* | 3/2004 | Peters | G06Q 10/10 705/4 |
| 8,082,163 | B2* | 12/2011 | Harkensee | G06Q 10/087 705/4 |
| 8,595,036 | B2* | 11/2013 | Jones | G06Q 40/08 705/4 |
| 8,719,058 | B2* | 5/2014 | Bonner | G16H 40/20 705/4 |
| 8,812,331 | B2* | 8/2014 | Jones | G06Q 40/08 705/4 |
| 2006/0184452 | A1* | 8/2006 | Barnes | G06Q 40/00 705/50 |
| 2007/0084370 | A1* | 4/2007 | Kuroda | G06F 17/30011 101/404 |
| 2008/0022373 | A1* | 1/2008 | Takahashi | G06F 21/6209 726/4 |

(Continued)

*Primary Examiner* — Frantzy Poinvil
(74) *Attorney, Agent, or Firm* — Marshall, Gerstein & Borun LLP; Randall G. Rueth (57) ABSTRACT

A computer-implemented method for providing a protective policy binder. The method includes receiving, by the one or more processors, an instruction to assemble a policy binder. The method includes receiving information indicative of a policy application, wherein the policy application corresponds to a customer and the policy binder. The method includes receiving information indicative of policy modifications, wherein the policy modifications correspond to the policy application. The method includes based, at least in part, on the received instruction and the information indicative of the policy application, determining an order for combining the policy application and the policy modifications. The method includes combining, by the one or more processors, the information indicative of the policy application and the information indicative of the policy modifications according to the determined order. The method includes providing, by the one or more processors, an output signal comprising the combined information.

8 Claims, 5 Drawing Sheets

(56) References Cited

U.S. PATENT DOCUMENTS

| | | | | |
|---|---|---|---|---|
| 2012/0215567 A1* | 8/2012 | Jones | ............... | G06Q 40/08 705/4 |
| 2012/0278110 A1* | 11/2012 | Jones | ............... | G06Q 40/08 705/4 |
| 2013/0238368 A1* | 9/2013 | Willis | ............... | G06Q 40/08 705/4 |
| 2014/0188524 A1* | 7/2014 | Stepeck | ............... | G06Q 40/08 705/4 |
| 2015/0356685 A1* | 12/2015 | Lindberg | ............... | G06Q 40/08 705/4 |

* cited by examiner

SYSTEM AND METHOD FOR FACILITATING GENERATION OF A POLICY BINDER

TECHNICAL FIELD

The present disclosure generally relates to a system and a method for generating a protective policy binder and, more particularly, to combining documents of the policy according to a determined order.

BACKGROUND

The development of computer networks has allowed for the storage and retrieval of data throughout many geographic regions. Data may be associated with a storage in one location and retrieved at a second location within a short period of time. Access to data in various locations allows multiple computing devices to work together in remote geographic locations.

SUMMARY

Example systems and methods for providing a protective policy binder are herein described. In accordance with a first example aspect, a computer-implemented method for providing a protective policy binder, the method executed by one or more processors programmed to perform the method is disclosed. The method includes, receiving, by the one or more processors, an instruction to assemble a policy binder. The method also includes receiving information indicative of a policy application, wherein the policy application corresponds to a customer and the policy binder. The method also includes receiving information indicative of policy modifications, wherein the policy modifications correspond to the policy application. Based, at least in part, on the received instruction and the information indicative of the policy application, the method also includes determining an order for combining the policy application and the policy modifications. The method also includes combining, by the one or more processors, the information indicative of the policy application and the information indicative of the policy modifications according to the determined order. The method also includes providing, by the one or more processors, an output signal comprising the combined information.

In accordance with a second example aspect, a system for providing a protective policy binder includes a communication network, one or more processors communicatively coupled to the communication network, and a non-transitory computer-readable memory coupled to the one or more processors is disclosed. The non-transitory computer-readable memory storing thereon instructions that, when executed by the one or more processors, cause the system to receive, via the communication network, an instruction to assemble a policy binder. The instructions also cause the system to receive information indicative of a policy application, wherein the policy application corresponds to a customer and the policy binder, wherein the policy application is associated with a first storage. The instructions also cause the system to receive information indicative of policy modifications, wherein the policy modifications correspond to the policy application, wherein the policy modifications are associated with a second storage. Based, at least in part, on the received instruction and the information indicative of the policy applications, the instructions also cause the system to determine an order for combining the policy application and the policy modifications. The instructions also cause the system to combine, by the one or more processors, the information indicative of the policy application and the information indicative of the policy modifications according to the determined order. The instructions also cause the system to provide, by the one or more processors, an output signal comprising the combined information.

In accordance with a third example aspect, a tangible, computer-readable medium stores instructions that when executed by one or more processors of a computer system cause the computer system to receive, via a communication network, an instruction to assemble a policy binder, to receive information indicative of a policy application, wherein the policy application corresponds to a customer and the policy binder, to receive information indicative of policy modifications, wherein the policy modifications correspond to the policy application, based, at least in part, on the received instruction and the information indicative of the policy application, to determine an order for combing the policy application and the policy modifications, to combine, by the one or more processors, the information indicative of the policy application and the information indicative of the policy modifications according to the determined order, and to provide, by the one or more processors, an output signal comprising the combined information.

In accordance with a fourth example aspect, a computer-implemented method for providing a protective policy binder, the method executed by one or more processors programmed to perform the method is disclosed. The method includes receiving, by the one or more processors, an instruction to assemble a policy binder, wherein the instruction comprises one or more rules for ordering a plurality of pages associated with the policy binder. The method also includes receiving information indicative of a policy application, wherein the policy application corresponds to a customer and the policy binder. The method also includes receiving information indicative of policy modifications, wherein the policy modifications correspond to the policy application. The method also includes receiving information indicative of supplemental policy information associated with the policy binder. The method also includes determining one or more position identifiers based on the information indicative of the supplemental policy information. Based, at least in part, on the received instruction and the one or more position identifiers, the method also includes determining an order for combining (i) the policy application, (ii) the policy modifications, and (iii) the supplemental policy information. The method also includes combining, by the one or more processors, (i) the policy application, (ii) the policy modifications, and (iii) the supplemental policy information according to the determined order. The method also includes providing, by the one or more processors, an output signal comprising the combined information.

In further accordance with any or more of the foregoing first, second, third, and fourth example aspects, a computer-implemented method, system, and computer-readable medium may further include any one or more of the following preferred forms.

In one form, receiving the instruction comprises (i) receiving one or more rules for document generation and (ii) extracting the instruction from the one or more rules for document generation.

In another form, the policy modifications further comprise at least one or more amendments to the policy application according to eligibility criteria, wherein the eligibility criteria is based on a level of a risk for insuring an individual.

In another form, providing the output signal comprises providing an instruction to print the combined information according to a template, wherein the template is based on the received instruction.

In another form, providing the output signal comprises providing a hyperlink for viewing the combined information according to a file format, wherein the file format is based on the received instruction.

In another form, the information indicative of the policy application comprises customer information and supplemental policy information, wherein the supplemental policy information is determined according to the policy binder.

In another form, the information indicative of the policy application is associated with a first storage and the information indicative of the policy modifications is associated with a second storage.

In another form, the policy modifications further comprise at least one or more amendments to the policy application corresponding to a beneficiary endorsement, wherein the beneficiary endorsement is associated with the customer.

In another form, the information indicative of the policy application comprises one or more position identifiers, wherein the one or more position identifiers correspond to combining one or more pages of the policy modifications with regard to one or more pages of the policy application.

In another form, the information indicative of the policy application comprises customer information and supplemental policy information, wherein the supplemental policy information is determined according to the policy binder.

In another form, the information indicative of the policy application is associated with a first storage and the information indicative of the policy modifications is associated with a second storage.

In another form, determining the one or more position identifiers comprises analyzing one or more fields of metadata corresponding to the supplemental policy information.

In another form, the one or more position identifiers correspond to one or more pages of the policy application.

In another form, the one or more position identifiers correspond to one or more pages of the policy modifications.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, where possible, the following description refers to the reference numerals included in the following figures, in which features depicted in multiple figures are designated with consistent reference numerals.

DETAILED DESCRIPTION

Typically, a policy binder is manually assembled from an insurance application, one or more amendments to the insurance application, and one or more batch generated policy pages. Any of the documents within the policy binder may be printed at various remote locations. Based on legacy systems that may be in place, an individual may need to collect the documents from multiple locations in order to assemble the policy binder. Depending on the number of policy binders ordered in a given day, this may take the individual an extended period of time to assemble the policy binders.

A computer-implemented method for providing a protective policy binder may be used to save time and lower costs associated with providing the protective policy binder. The method executed by one or more processors programmed to perform the method includes receiving, by the one or more processors, an instruction to assemble a policy binder. In one example, the instruction may be received via a user interface once it has been determined that the policy binder is ready to be provided. In another example, the instruction may be received by a module that is configured to generate one or more policy binders.

The method also includes receiving information indicative of a policy application. The policy application may correspond to a customer and the policy binder. In one example, the policy application may be received via an optical scan of a paper application. Further, the policy application may also contain one or more generated pages associated with the policy binder.

The method also includes receiving information indicative of policy modifications. The policy modifications correspond to the policy application. By way of example, the policy modifications may include an increase or decrease to a beneficiary amount corresponding to the policy application. In one embodiment, the policy modifications may be created by an underwriter.

Based, at least in part, on the received instruction and the information indicative of the policy application, the method may also include determining an order for combining the policy application and the policy modifications. The order may be determined according to one or more rules for document generation. In one example, a user interface may be configured to determine the order based on input from an individual.

The method also includes providing, by the one or more processors, an output signal comprising the combined information. In one example, the output signal may include an instruction to print the combined information. The combined information may be printed according to a given template. In another example, the output signal may include a hyperlink for viewing the combined information.

The method may help to reduce the cost associated with the production of policy binders. Determining the order for combining the policy application and the policy modifications may also improve a process associated with production of policy binders during a given period of time by enabling a higher output of policy binders. By way of example, the process may pertain to the production of policy binders that are assembled in a paper format and/or an electronic version.

The use of a determined order for combining the policy application and the policy modifications may also allow for a reduction in time needed to implement one or more changes to a given policy binder. For instance, if a given policy is scheduled to become effective on a given date that requires providing additional documents to be combined with the policy application and the policy modifications, then the one or more rules associated with the order may be updated in order to create a seamless transition between current and future policies.

Further, the determined order may also allow for printing the policy binder in an efficient manner by retrieving data from remote locations and printing in one location. This may also serve to reduce the likelihood of errors that may occur from having to combine documents from multiple locations due to potential problems associated with one or more printers.

Figure 1:
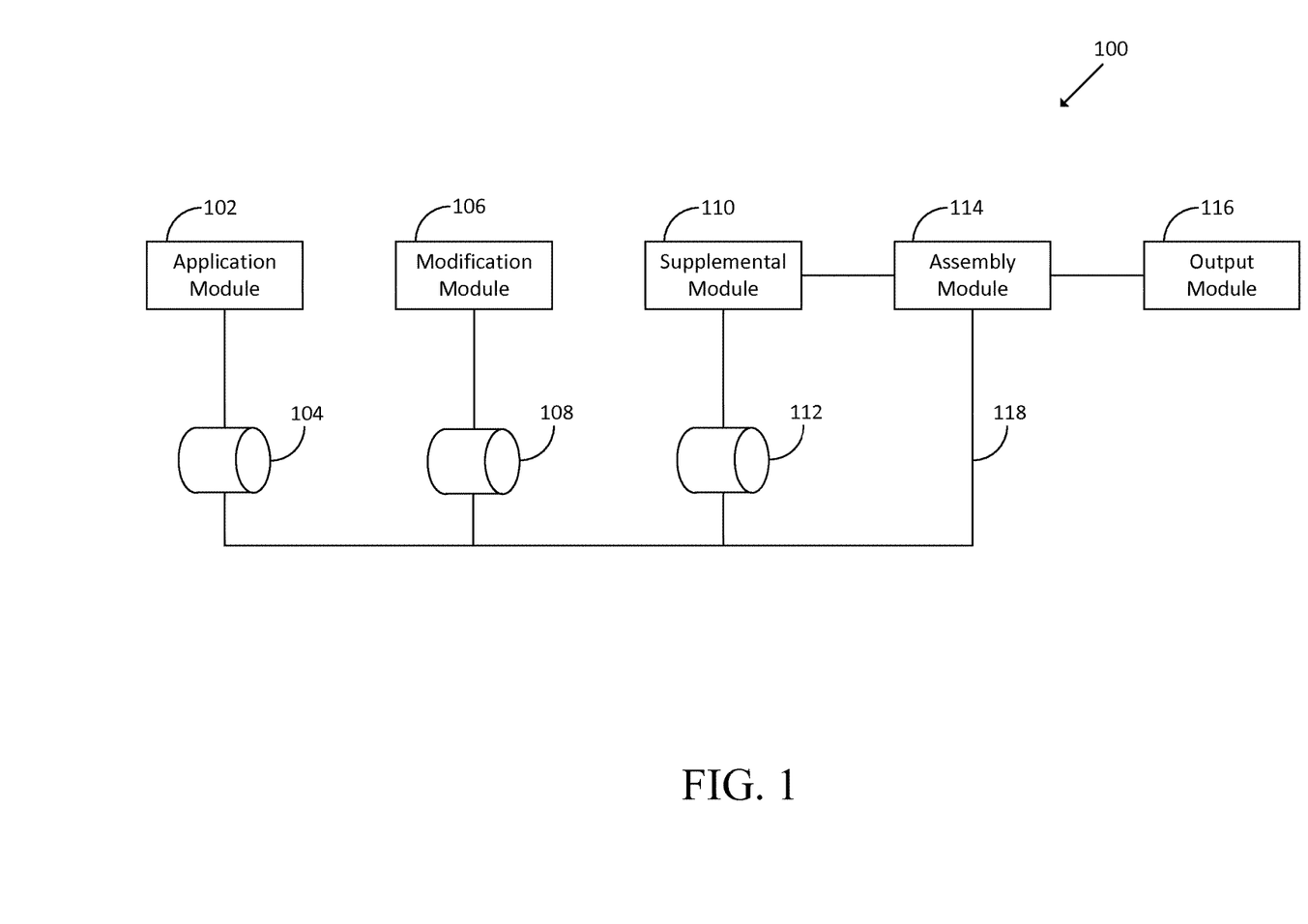
FIG. 1 is a general overview of generating a policy binder.

Referring now to the figures, FIG. 1 illustrates an example system 100 for providing a protective policy binder. The system 100 in FIG. 1 includes an application module 102, a first storage 104, a modification module 106, a second storage 108, a supplemental module 110, a third storage 112, an assembly module 114, and an output module 116. The modules may be coupled to a communication network 118. The assembly module 114 is communicatively coupled to the supplemental module 110 and the output module 116 via the communication network 118. The modules also may include one or more processors that are communicatively coupled to the communication network 118. Further, the modules may also include a non-transitory computer-readable memory coupled to the one or more processors and storing thereon instructions.

The application module 102 may be configured to receive a policy application. The policy application may be received via a user interface. In one scenario, an agent may sit down with a customer and assist with the input of information pertaining to the policy application. In another scenario, the customer may complete the policy application via the Internet.

In another example, the application module 102 may include one or more optical sensors for scanning a paper policy application. The application module 102 may be configured to receive the policy application and store the policy application in the first storage 104. The policy application may include customer specific information such as address and other identifying information. The policy application may also include additional documents such as a life application supplement. As shown in FIG. 1, the application module 102 is communicatively coupled to the first storage 104.

The first storage 104 may include non-transitory computer-readable memory that is capable of storing the policy application. The first storage 104 may be located remotely from the application module 102. In one scenario, the first storage 104 may be associated with a cloud based server. The first storage 104 may be configured to store the policy application in a variety of file formats. For instance, the policy application may be stored as a Portable Document Format (PDF) or a Tagged Image File Format (TIF/TIFF).

The modification module 106 may be configured to provide policy modifications. The policy modifications may include one or more amendments to the policy application. In one scenario, the one or more amendments to the policy application may correspond to a beneficiary amount. In this scenario, the beneficiary amount is associated with the customer. The modification module 106 may include an interface for receiving the one more amendments to the policy application. By way of example, an underwriter may provide the one or more amendments via the interface of the modification module 106. The modification module 106 is communicatively coupled to the second storage 108.

In another example, the policy modifications may include additional documents and/or illustrations associated with the policy application. In one instance, the modification module 106 may revise illustrations associated with the policy application according to adjustments made to a rate by the underwriter. In this instance, the underwriter may review the results of one or more health examinations performed on the individual in order to determine one or more adjustments to the rate. Based on the adjustments, the modification module 106 may provide one or more revised documents and/or illustrations associated with the policy application.

The second storage 108 may include non-transitory computer-readable memory that is capable of storing the policy modifications. In one example, the second storage 108 may be located remotely from the modification module 106 and the first storage 104. By way of example the second storage 108 may be configured to store policy modifications such as beneficiary endorsements and amendments to the policy application.

The supplemental module 110 may be configured to generate various documents associated with the policy application. For instance, the supplemental module 110 may receive an instruction to generate one or more pages including but not limited to a cover page, policy pages, automatically generated endorsements, back cover page, policy summary, state specific supplements, and illustrations. The generated one or more pages may include identifiers corresponding with the order of the policy application, policy modifications and the generated one or more pages. As shown in FIG. 1, the supplemental module 110 is communicatively coupled to the third storage 112.

The third storage 112 may include non-transitory computer-readable memory that is capable of storing the generated documents associated with the policy application. By way of example, the third storage 112 may be located remotely from the supplemental module 110, the first storage 104, and the second storage 108.

The assembly module 114 may be configured to receive an instruction to assemble a policy binder. In one example, the instruction to assemble the policy binder may include one or more rules for document generation. In this example, the instruction may be extracted from the one or more rules for document generation. For instance, a given policy binder may be associated with a state specific supplement that is only applicable to customers within Illinois. In this instance, the one or more rules may indicate to generate the state specific supplement based on customer's address being within the state of Illinois.

Based on the received instruction, the assembly module 114 may be configured to gather information from one or more storages. In one example, the assembly module 114 may access the first storage 104 to retrieve the policy application, the second storage 108 to retrieve the policy modifications, and the third storage 112 to retrieve the generated documents. In this example, based at least in part on the received instruction and the generated documents, the assembly module 114 may be configured to determine an order for combining the policy application, the policy modifications, and the generated documents.

According to the determined order, one or more processors (not shown) of the assembly module 114 may be configured to combine the policy application, the policy modifications, and the generated documents. The assembly module 114 may then provide the combined information as an output signal to the output module 116.

The output module 116 may be configured to provide the output signal in various forms according to the received instruction. In one instance, the received instruction may indicate to provide the output signal as an instruction to print the combined information. In this instance, a printer (not shown) would receive the output signal and proceed to print the combined information according to a template. In another scenario, the received instruction may indicate to provide a hyperlink for viewing the combined information according to a file format. In this scenario, the hyperlink would allow an individual to view the combined information.

Figure 2:
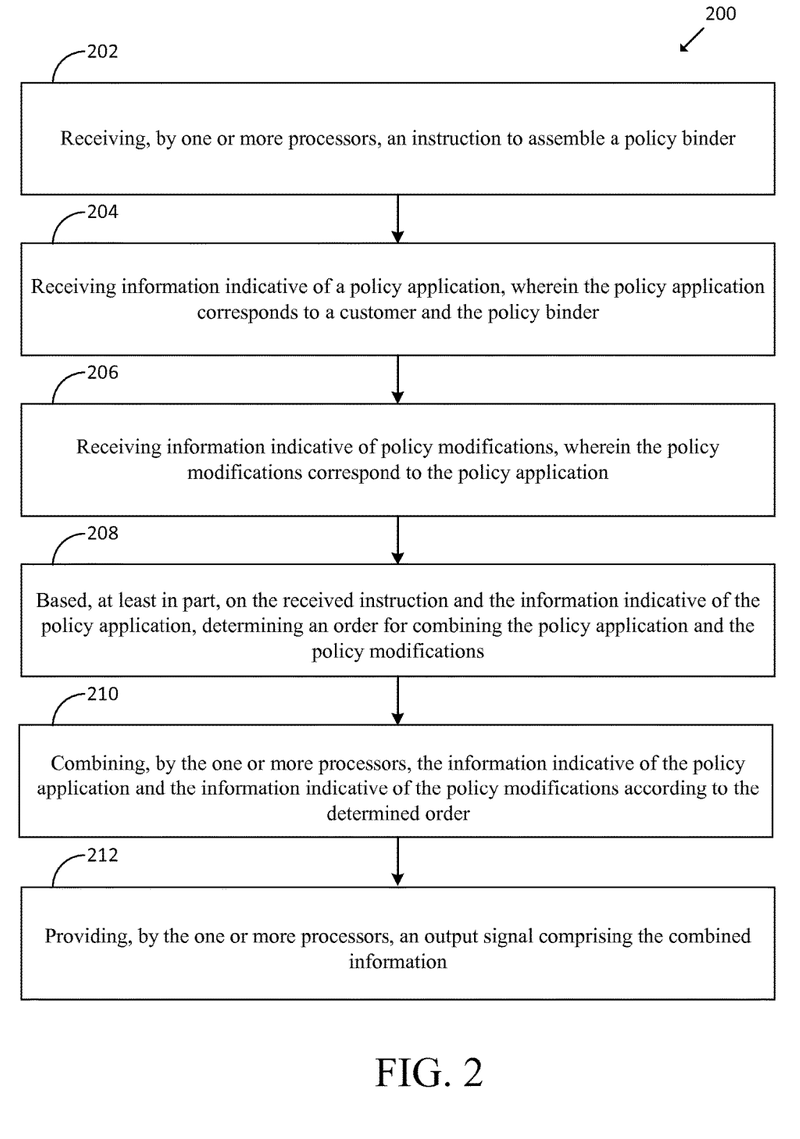
FIG. 2 depicts an example method for providing a protective policy binder.

FIG. 2 is a block diagram of an example method for providing a protective policy binder in accordance with at least some embodiments described herein. Method 200 may include one or more operations, functions, or actions as illustrated by one or more of blocks 202-212. Although the blocks are illustrated in a sequential order, these blocks may in some instances be performed in parallel, and/or in a different order than those described therein. Also, the various blocks may be combined into fewer blocks, divided into additional blocks, and/or removed based up the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as a computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 200 and other processes and methods disclosed herein, each block in FIG. 2 may represent circuitry that is wired to perform the specific logical functions in the process. Illustrative methods, such as method 200, may be carried out in whole or in part by a component or components in the cloud and/or system, such as by the one or more components of the system 100 shown in FIG. 1. However, it should be understood that example methods, such as method 200, may be carried out by other entities or combinations of entities (i.e., by other computing devices and/or combinations of computing devices), without departing from the scope of the invention.

For example, functions of the method 200 may be fully performed by a computing device (or components of a computing device such as one or more processors), or may be distributed across multiple components of the computing device, across multiple computing devices, and/or across a server.

As shown by block 202, method 200 includes receiving, by one or more processors, an instruction to assemble a policy binder. In one example, the instruction may include an order associated with documents within the policy binder. The instruction may further include document keys and locations corresponding to the documents within the policy binder.

In one example, receiving the instruction may include receiving one or more rules for document generation. In this example, the instruction may be extracted from the one or more rules for document generation. The one or more rules may correspond to a specific policy binder. For instance, the one or more rules may indicate how to combine one or more types of documents such as policy application documents and application supplemental documents. By way of example, the one or more rules may be updated to reflect changes to policies and/or changes to company procedures.

As shown by block 204, method 200 includes receiving information indicative of a policy application, wherein the policy application corresponds to a customer and the policy binder. By way of example, the information indicative of the policy application may include customer information and supplemental policy information. In this example, the supplemental policy information is specific to the policy binder. For instance, the supplemental policy information may include a number of pages that include policy documents and automatically generated documents associated with a specific policy binder.

In another example, the information indicative of the policy application comprises one or more position identifiers. In this example, the one or more position identifiers correspond to an order for combining one or more pages of the policy modifications with regard to one or more pages of the policy application. In one scenario, the position identifiers may be stored in one or more data fields associated with the supplemental policy information.

As shown by block 206, method 200 includes receiving information indicative of policy modifications, wherein the policy modifications correspond to the policy application. By way of example, the policy modifications may also include at least one or more amendments to the policy application according to eligibility criteria. In this example, the eligibility criteria is based on a level of a risk for insuring an individual. In another example, at least one or more amendments to the policy application correspond to a beneficiary endorsement. In this example the beneficiary endorsement is associated with the customer.

Within examples, an underwriter may review the policy application and create the policy modifications based on the eligibility criteria and one or more other procedures. Once the policy modifications have been created, they may be saved to a storage. In one scenario, the information indicative of the policy application is associated with a first storage and the information indicative of the policy modifications is associated with a second storage. In this scenario, the first storage and the second storage may be located in different geographic locations.

In another example, the policy modifications may include additional documents and/or illustrations that pertain to one or more differences between an original quote received by an individual and an adjustment to the original quote. For example, the individual may receive the original quote once the policy application is completed and then wait to see if any changes are made to the policy application based on an evaluation. In one instance, an underwriter may make an adjustment to the original quote after evaluating the policy application. In this instance, the policy modifications may include additional documents and/or illustrations that help to explain how the adjustment affects the policy application.

As shown by block 208, method 200 includes based, at least in part, on the received instruction and the information indicative of the policy application, determining an order for combining the policy application and the policy modifications. The received instruction may include information on how to separate various documents in order to combine them with other documents. For instance, the generated documents may contain various pages that need to be separated in order to combine the policy binder in a manner that allows an individual to understand all of the information that is contained within all of the documents. The determined order would allow various documents to be retrieved from various storage locations and combined remotely in order to generate the policy binder.

In one example, the information indicative of the policy application may include position identifiers associated with one or more generated documents. For instance, a generated document such as a cover page may include a position identifier that indicates to include three pages of customer information following the cover page. The position identifier may be a predetermined mark such as a one-dimensional bar code, or a two-dimensional bar code such as a quick response (QR) code positioned in a given location of the page. In another example, the position identifier may be included as metadata associated with the cover page. Other examples are possible as well with regard to the position identifiers.

As shown by block 210, method 200 includes combining, by the one or more processors, the information indicative of the policy application and the information indicative of the policy modifications according to the determined order. In one scenario, the combined information may be stored for further retrieval. In one instance, the combined information may be converted to a specific file format capable of being viewed on a display of a computing device.

As shown by block 212, method 200 includes providing, by the one or more processors, an output signal comprising the combined information. By way of example, providing the output signal may also include providing an instruction to print the combined information according to a template. In this example, the template is based on the received instruction. For instance, the template may indicate how to format various sections of pages and other style options associated with the combined information. In another instance, combining the information may also involve removing the position identifiers once all of the pages have been combined in the determined order.

Based on preferences of a customer, providing the output signal may also include providing a hyperlink for viewing the combined information according to a file format. The file format is based on the received instruction. Within examples, the file format may pertain to a widely used format such as a PDF format. Other file formats are possible as well.

Figure 3:
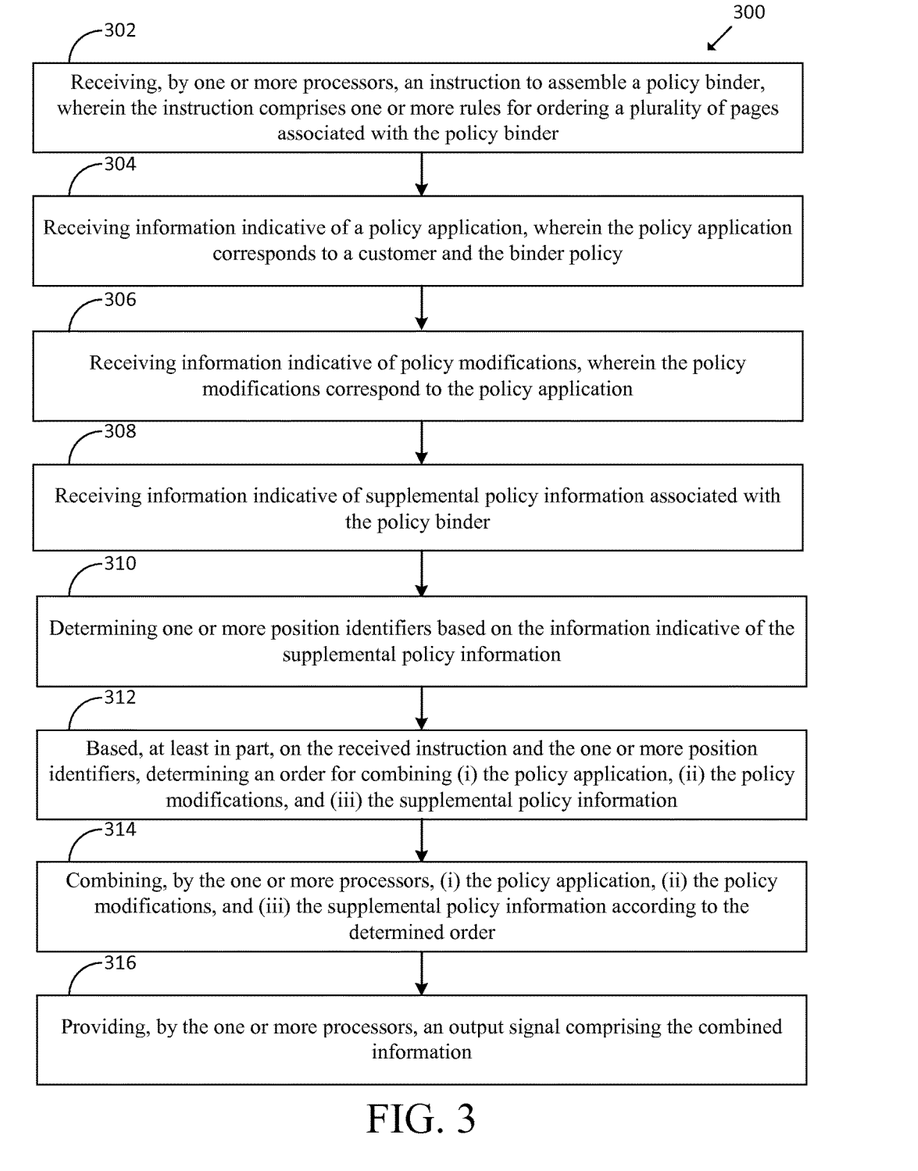
FIG. 3 depicts another example method for providing a protective policy binder.

FIG. 3 is a block diagram of another example method for providing a protective policy binder, in accordance with at least some embodiments described herein. Method 300 may include one or more operations, functions, or actions as illustrated by one or more blocks 302-316. Although the blocks are illustrated in sequential order, these blocks may in some instances be performed in parallel, and/or in a different order than those described therein. Also, the various blocks may be combined into fewer blocks, divided into additional blocks, and/or removed based upon the desired implementation.

As shown by block 302, method 300 includes receiving, by one or more processors, an instruction to assemble a policy binder, wherein the instruction comprises one or more rules for ordering a plurality of pages associated with the policy binder. In one example, the one or more rules for ordering a plurality of pages may be determined according to information within the policy application.

As shown by block 304, method 300 includes receiving information indicative of a policy application, wherein the policy application corresponds to a customer and the policy binder. In one example, the policy application may be initially submitted through the application module 102 of FIG. 1. The policy application may be stored in the first storage 104 of FIG. 1.

As shown by block 306, method 300 includes receiving information indicative of policy modifications, wherein the policy modifications correspond to the policy application. By way of example, the policy modifications may be initially submitted through the modification module 106 of FIG. 1. The policy modifications may be stored in the second storage 108 of FIG. 1.

As shown by block 308, method 300 includes receiving information indicative of supplemental policy information associated with the policy binder. In one scenario, the supplemental policy information may include one or more pages that are generated by an instruction received at the supplemental module 110 of FIG. 1. In this scenario, the supplemental policy information may be stored at the third storage 112 of FIG. 1.

As shown by block 310, method 300 includes determining one or more position identifiers based on the information indicative of the supplemental policy information. In one example, determining the one or more position identifiers includes analyzing one or more fields of metadata corresponding to the supplemental policy information. Within examples, the analysis may be performed by the assembly module 114 of FIG. 1.

In one scenario, the one or more position identifiers may correspond to one or more pages of the policy application. In another scenario, the one or more position identifiers may correspond to one or more pages of the policy modifications. In both of these scenarios, the one or more position identifiers would server to indicate how to assemble the policy binder.

As shown by block 312, method 300 includes based, at least in part, on the received instruction and the one or more position identifiers, determining an order for combining (i) the policy application, (ii) the policy modifications, and (iii) the supplemental policy information. In one scenario, the assembly module 114 of FIG. 1 may be configured to determine the order.

As shown by block 314, method 300 includes combining, by the one or more processors, (i) the policy application, (ii) the policy modifications, and (iii) the supplemental policy information according to the determined order. In one example, the assembly module 114 of FIG. 1 may also be configured to combine the information. In another example, the information may be combined into a single document using software such as AdLib.

As shown by block 316, method 300 includes providing, by the one or more processors, an output signal comprising the combined information. In one example, the output module 116 of FIG. 1 may be configured to receive the combined information and provide the output signal.

The automation of the assembly of the policy binder may be performed using an electronic system. FIGS. 11 and 12 provide an exemplary structural basis for the network and computational platforms related to such a system.

Figure 4:
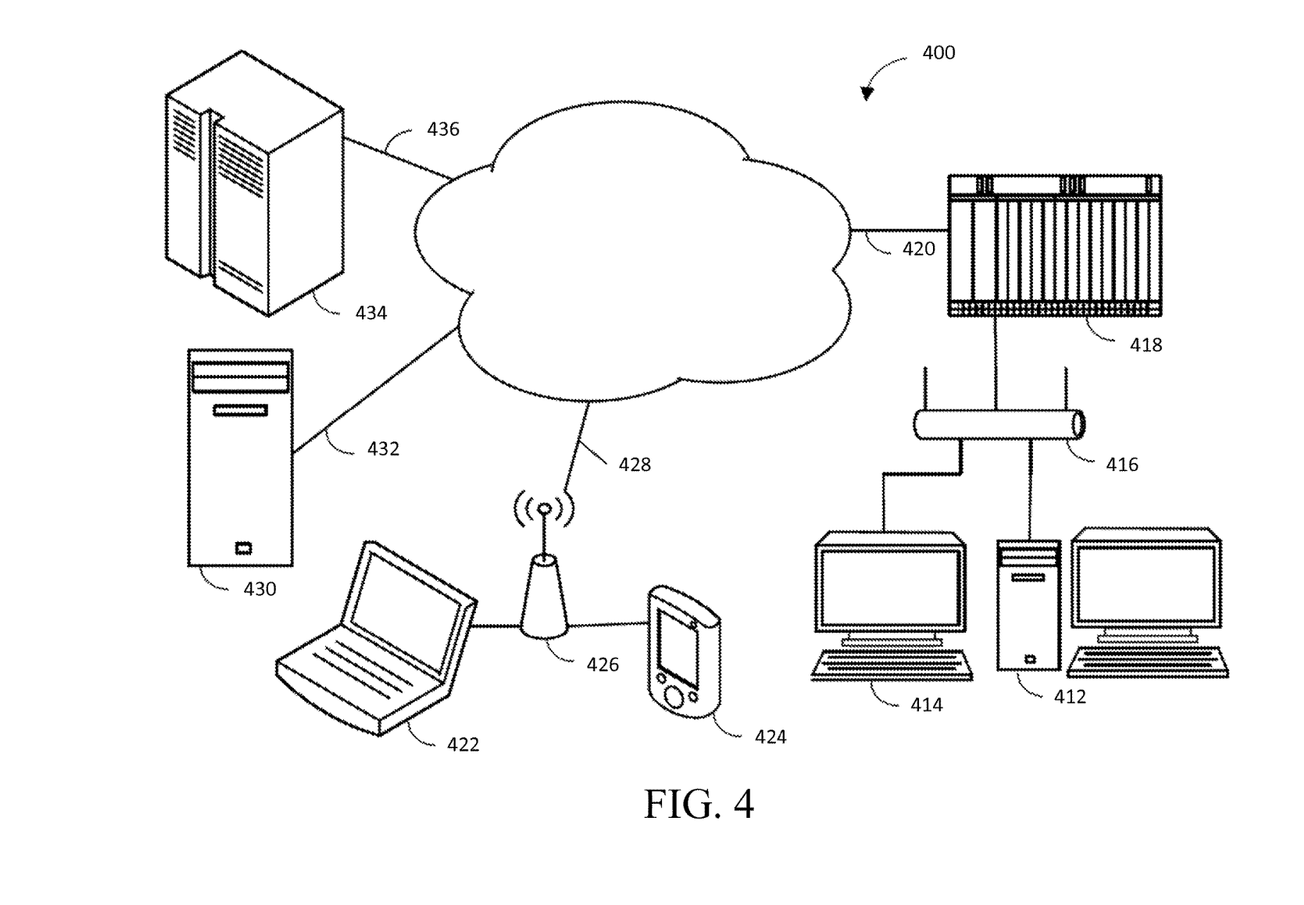
FIG. 4 depicts an exemplary block diagram of a network and computer hardware that may be utilized in an exemplary system in accordance with the described embodiments.

FIG. 4 illustrates an exemplary block diagram of a network 400 and computer hardware that may be utilized in an exemplary system for providing a protective policy binder in accordance with the described embodiments. The network 400 may be the Internet, a virtual private network (VPN), or any other network that allows one or more computers, communication devices, databases, etc., to be communicatively connected to each other. The network 400 may be connected to a personal computer 412, and a computer terminal 414 via an Ethernet 416 and a router 418, and a landline 420. The Ethernet 416 may be a subnet of a larger Internet Protocol network. Other networked resources, such as projectors or printers (not depicted), may also be supported via the Ethernet 416 or another data network. Additionally, the network 400 may be wirelessly connected to a laptop computer 422 and a personal data assistant 424 via a wireless communication station 426 and a wireless link 428. Similarly, a server 430 may be connected to the network 400 using a communication link 432 and a mainframe 434 may be connected to the network 400 using another communication link 436. The network 400 may be useful for supporting peer-to-peer network traffic. In some embodiments, the information pertaining to the policy binder may be received by more than one computer. In other embodiments, the information pertaining to the policy binder may be received from more than one computer and/or remotely-accessible memory device.

Calculations performed in the determination of an order for combining the policy application and the policy modifications may be performed by a computer such as the personal computer 412, laptop computer 422, server 430 or mainframe 434, for example. In some embodiments, some or all of the calculations may be performed by more than one computer. The calculations may be made by determining the value of a data field associated with the policy application, for example.

Combining the policy application, the policy modifications, and the supplemental policy information described above in the embodiments may also be performed by a computer such as the personal computer 412, laptop computer 422, server 430 or mainframe 434, for example. In some embodiments, combining the policy application may include sending data over a network such as network 400 to another computing device.

Figure 5:
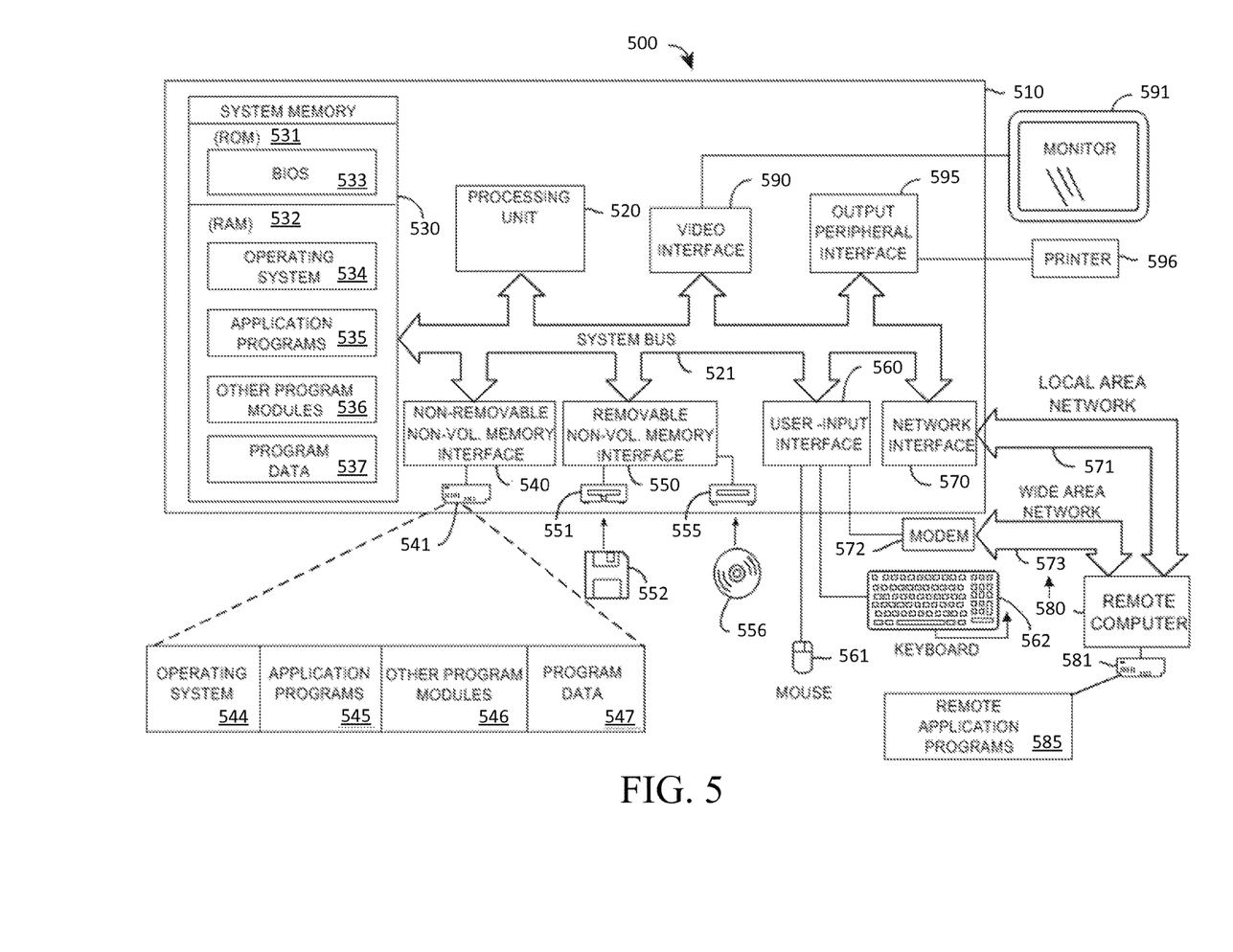
FIG. 5 depicts an exemplary block diagram of a computer system on which an exemplary system may operate in accordance with the described embodiments.

FIG. 5 illustrates an exemplary block diagram of a system 500 on which an exemplary method for providing a protective policy binder may operate in accordance with the described embodiments. The system 500 of FIG. 5 includes a computing device in the form of a computer 510. Components of the computer 510 may include, and are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 510 typically includes a variety of computer readable media. Computer readable media can be any available media that can be accessed by computer 510 and includes both volatile and nonvolatile media, and both removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules or routines, e.g., analyzing, calculating, indicating, etc., that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and cursor control device 561, commonly referred to as a mouse, trackball or touch pad. A screen 591 or other type of display device is also connected to the system bus 521 via an interface, such as a graphics controller 590. In addition to the screen 591, computers may also include other peripheral output devices such as printer 596, which may be connected through an output peripheral interface 595.

The computer 510 may operate in a networked environment using logical connections to one or more remote computers, such as a remote computer 580. The remote computer 580 may include the application module 102 of FIG. 1. The logical connections depicted in FIG. 5 include a local area network (LAN) 571 and a wide area network (WAN) 573, but may also include other networks. Such networking environments are commonplace in offices, enterprise-wide computer networks, intranets, and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the input interface 560, or other appropriate mechanism. In a networked environment, program modules depicted relative to the computer 510, or portions thereof, may be stored in the remote memory storage device 581. By way of example, and not limitation, FIG. 5 illustrates remote application programs 585 as residing on memory device 581.

The communications connections 570, 572 allow the device to communicate with other devices. The communications connections 570, 572 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

The embodiments for the methods of providing a protective policy binder described above may be implemented in part or in their entirety using one or more computer systems such as the computer system 500 illustrated in FIG. 5. The policy application, policy modifications and/or the supplemental policy information may be received by a computer such as the computer 510, for example. The policy application, policy modifications and/or the supplemental policy information may be received over a communication medium such as local area network 571 or wide area network 573, via network interface 570 or user-input interface 560, for example. As another example, policy application, policy modifications and/or the supplemental policy information may be received from a remote source such as the remote computer 580 where the data is initially stored on memory device such as the memory storage device 581. As another example, policy application, policy modifications and/or the supplemental policy information may be received from a removable memory source such as the nonvolatile magnetic disk 552 or the nonvolatile optical disk 556. As another example, policy application, policy modifications and/or the supplemental policy information may be received as a result of a human entering data through an input device such as the keyboard 562.

Some or all analyzing or calculating performed in the determination of an order for combining the policy application, the policy modifications and/or the supplemental policy information may be performed by a computer such as the computer 510, and more specifically may be performed by one or more processors, such as the processing unit 520, for example. In some embodiments, some calculations may be performed by a first computer such as the computer 510 while other calculations may be performed by one or more other computers such as the remote computer 580. The analyses and/or calculations may be performed according to instructions that are part of a program such as the application programs 535, the application programs 545 and/or the remote application programs 585, for example.

Determining an order for combining the policy application, the policy modifications and/or the supplemental policy information may also be performed by a computer such as the computer 510. The indications may be made by setting the value of a data field stored in the ROM memory 531 and/or the RAM memory 532, for example. In some embodiments, combining the policy application, the policy modifications and/or the supplemental policy information may include sending data over a network such as the local area network 571 or the wide area network 573 to another computer, such as the remote computer 581. In other embodiments, providing an output signal including the combined information may include sending data over a video interface such as the video interface 590 to display information relating to the policy binder on an output device such as the screen 591 or the printer 596, for example. Although one or more embodiments have been described with respect to providing a protective policy binder, the one or more embodiments could also be used in other instances where a number of different documents are created and stored at different points in time before being merged together for delivery.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of a communication system and method for a mobile platform. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A computer-implemented method for providing a protective policy binder, the method executed by one or more processors programmed to perform the method, the method comprising: receiving, by the one or more processors, an instruction to assemble a policy binder; receiving information indicative of a policy application, wherein the policy application corresponds to a customer and the policy binder; receiving information indicative of policy modifications, wherein the policy modifications correspond to the policy application; based, at least in part, on the received instruction and the information indicative of the policy application, determining an order for combining the policy application and the policy modifications; combining, by the one or more processors, the information indicative of the policy application and the information indicative of the policy modifications according to the determined order; and providing, by the one or more processors, an output signal comprising the combined information.

Aspect 2: The computer-implemented method of aspect 1, wherein receiving the instruction comprises (i) receiving one or more rules for document generation and (ii) extracting the instruction from the one or more rules for document generation.

Aspect 3: The computer-implemented method of aspects 1-2, wherein the policy modifications further comprise: at least one or more amendments to the policy application according to eligibility criteria, wherein the eligibility criteria is based on a level of a risk for insuring an individual.

Aspect 4: The computer-implemented method of aspects 1-3, wherein providing the output signal comprises providing an instruction to print the combined information according to a template, wherein the template is based on the received instruction.

Aspect 5: The computer-implemented method of aspects 1-4, wherein providing the output signal comprises providing a hyperlink for viewing the combined information according to a file format, wherein the file format is based on the received instruction.

Aspect 6: The computer-implemented method of aspects 1-5, wherein the information indicative of the policy application comprises customer information and supplemental policy information, wherein the supplemental policy information is determined according to the policy binder.

Aspect 7: The computer-implemented method of aspects 1-6, wherein the information indicative of the policy application is associated with a first storage and the information indicative of the policy modifications is associated with a second storage.

Aspect 8: A system for providing a protective policy binder, the system comprising: a communication network; one or more processors communicatively coupled to the communication network; and a non-transitory computer-readable memory coupled to the one or more processors and storing thereon instructions that, when executed by the one or more processors, cause the system to: receive, via the communication network, an instruction to assemble a policy binder; receive information indicative of a policy application, wherein the policy application corresponds to a customer and the policy binder, wherein the policy application is associated with a first storage; receive information indicative of policy modifications, wherein the policy modifications correspond to the policy application, wherein the policy modifications are associated with a second storage; based, at least in part, on the received instruction and the information indicative of the policy application, determine an order for combining the policy application and the policy modifications; combine, by the one or more processors, the information indicative of the policy application and the information indicative of the policy modifications according to the determined order; and provide, by the one or more processors, an output signal comprising the combined information.

Aspect 9: The system of aspect 8, wherein receiving the instruction comprises (i) receiving one or more rules for document generation and (ii) extracting the instruction from the one or more rules for document generation.

Aspect 10: The system of aspects 8-9, wherein the policy modifications further comprise: at least one or more amendments to the policy application according to eligibility criteria, wherein the eligibility criteria is based on a level of a risk for insuring an individual.

Aspect 11: The system of aspects 8-10, wherein the policy modifications further comprise: at least one or more amendments to the policy application corresponding to a beneficiary endorsement, wherein the beneficiary endorsement is associated with the customer.

Aspect 12: The system of aspects 8-11, wherein providing the output signal comprises providing an instruction to print the combined information according to a template, wherein the template is based on the received instruction.

Aspect 13: The system of aspects 8-12, wherein providing the output signal comprises providing a hyperlink for viewing the combined information according to a file format, wherein the file format is based on the received instruction.

Aspect 14: The system of aspects 8-13, wherein the information indicative of the policy application comprises one or more position identifiers, wherein the one or more position identifiers correspond to combining one or more pages of the policy modifications with regard to one or more pages of the policy application.

Aspect 15: A tangible, computer-readable medium storing instructions that when executed by one or more processors of a computer system cause the computer system to: receive, via a communication network, an instruction to assemble a policy binder; receive information indicative of a policy application, wherein the policy application corresponds to a customer and the policy binder; receive information indicative of policy modifications, wherein the policy modifications correspond to the policy application; based, at least in part, on the received instruction and the information indicative of the policy application, determine an order for combining the policy application and the policy modifications; combine, by the one or more processors, the information indicative of the policy application and the information indicative of the policy modifications according to the determined order; and provide, by the one or more processors, an output signal comprising the combined information.

Aspect 16: The computer-readable medium of aspect 15, wherein receiving the instruction comprises (i) receiving one or more rules for document generation and (ii) extracting the instruction from the one or more rules for document generation.

Aspect 17: The computer-readable medium of aspects 15-16, wherein the policy modifications further comprise: at least one or more amendments to the policy application according to eligibility criteria, wherein the eligibility criteria is based on a level of a risk for insuring an individual.

Aspect 18: The computer-readable medium of aspects 15-17, wherein providing the output signal comprises providing an instruction to print the combined information according to a template, wherein the template is based on the received instruction.

Aspect 19: The computer-readable medium of aspects 15-18, wherein providing the output signal comprises providing a hyperlink for viewing the combined information according to a file format, wherein the file format is based on the received instruction.

Aspect 20: The computer-readable medium of aspects 15-19, wherein the information indicative of the policy application comprises customer information and supplemental policy information, wherein the supplemental policy information is determined according to the policy binder.

Aspect 21: The computer-readable medium of aspects 15-20, wherein the information indicative of the policy application is associated with a first storage and the information indicative of the policy modifications is associated with a second storage.

Aspect 22: A computer-implemented method for providing a protective policy binder, the method executed by one or more processors programmed to perform the method, the method comprising: receiving, by the one or more processors, an instruction to assemble a policy binder, wherein the instruction comprises one or more rules for ordering a plurality of pages associated with the policy binder; receiving information indicative of a policy application, wherein the policy application corresponds to a customer and the policy binder; receiving information indicative of policy modifications, wherein the policy modifications correspond to the policy application; receiving information indicative of supplemental policy information associated with the policy binder; determining one or more position identifiers based on the information indicative of the supplemental policy information; based, at least in part, on the received instruction and the one or more position identifiers, determining an order for combining (i) the policy application, (ii) the policy modifications, and (iii) the supplemental policy information; combining, by the one or more processors, (i) the policy application, (ii) the policy modifications, and (iii) the supplemental policy information according to the determined order; and providing, by the one or more processors, an output signal comprising the combined information.

Aspect 23: The computer-implemented method of aspect 22, wherein determining the one or more position identifiers comprises analyzing one or more fields of metadata corresponding to the supplemental policy information.

Aspect 24: The computer-implemented method of aspect 22-23, wherein the one or more position identifiers correspond to one or more pages of the policy application.

Aspect 25: The computer-implemented method of aspects 22-24, wherein the one or more position identifiers correspond to one or more pages of the policy modifications.

What is claimed is:

1. A cloud-based document management system for sequencing remotely distributed documents, the cloud-based document management system comprising:
   a first remote document storage location, the first remote document storage location storing a first sequence of electronic documents, the first sequence of electronic documents including a first set of policy application data of a particular individual;
   a second remote document storage location, the second remote document storage location storing a second sequence of electronic documents, the second sequence of electronic documents including a second set of policy application data of the particular individual;
   a cloud-based platform communicatively coupled, via a network, to the first remote document storage location and the second remote document storage location, each of the first remote document storage location and the second remote document storage location located at remote geographic locations from the cloud-based platform; and
   a sequencing component communicatively coupled to the cloud-based platform, the sequencing component configured to:
   (a) receive an instruction to generate a protective policy binder for the individual,
   (b) based on the instruction, access the first remote document storage location to retrieve the first sequence of electronic documents,
   (c) based on the instruction, access the second remote document storage location to retrieve the second sequence of electronic documents,
   (d) sequence the first sequence of electronic documents in a first order with the second sequence of electronic documents to generate a first protective policy binder,
   (e) determine the policy application data of the particular individual is associated with policy modification data,
   (f) modify the first protective policy binder with the policy modification data to generate a second protective policy binder, the second protective policy binder having a second order based on the first sequence of electronic documents, the second sequence of electronic documents, and the policy modification data, and (g) generate an output signal causing the performance of at least one of (1) printing the second protective policy binder, or (2) generating a hyperlink for viewing the second protective policy binder electronically.

2. The system of claim 1, wherein receiving the instruction comprises (i) receiving one or more rules for document generation and (ii) extracting the instruction from the one or more rules for document generation.

3. The system of claim 1, wherein the policy modification data includes at least one or more amendments to a policy application of the individual according to eligibility criteria, wherein the eligibility criteria is based on a level of a risk for insuring the individual.

4. The system of claim 1, wherein the policy modification data further includes at least one or more amendments to a policy application corresponding to a beneficiary endorsement, wherein the beneficiary endorsement is associated with the individual.

5. The system of claim 1, wherein generating the output signal includes providing an instruction to print the second protective policy binder according to a template, wherein the template is based on the received instruction.

6. The system of claim 1, wherein generating the output signal includes providing a hyperlink for viewing the second protective policy binder according to a file format, wherein the file format is based on the received instruction.

7. The system of claim 1, wherein the policy modification data includes one or more position identifiers, the one or more position identifiers corresponding to data positions within the first sequence of electronic documents or the second sequence of electronic documents.

8. The system of claim 1, wherein the policy modification data is stored remotely at the first remote document storage location or the second remote document storage location.

* * * * *